J. B. SMITH.
Coffee Pot.
No. 71,237. Patented Nov. 19, 1867.
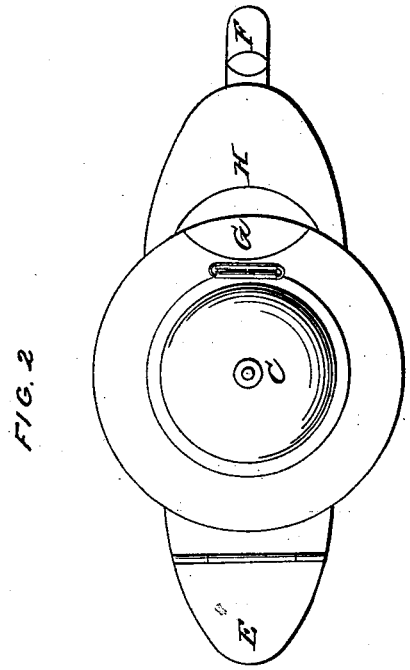
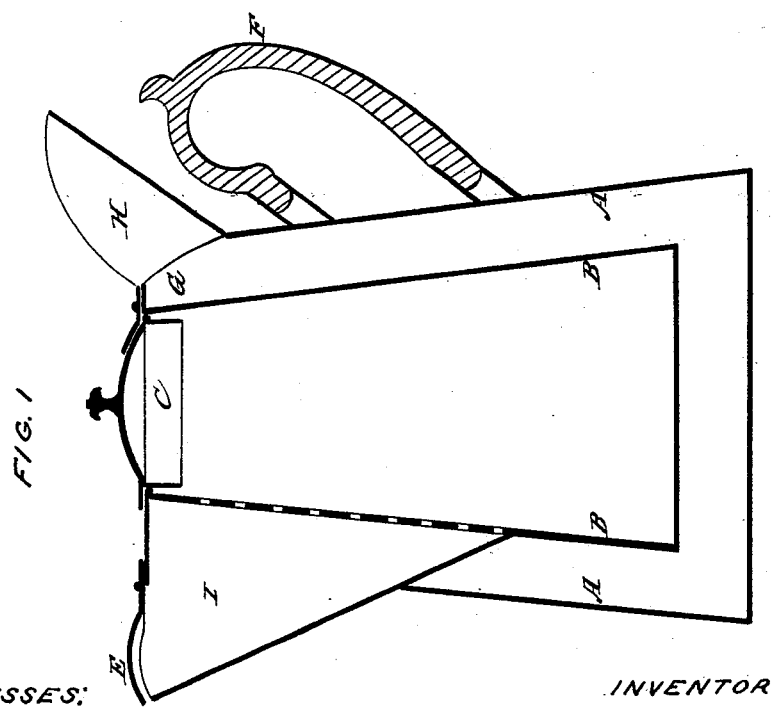
WITNESSES:
G.W. Myggatt
William H. Cornor
INVENTOR:
J. B. Smith

United States Patent Office.

J. B. SMITH, OF MILWAUKEE, WISCONSIN.

Letters Patent No. 71,237, dated November 19, 1867.

COFFEE-POTS.

*The Schedule referred to in these Letters Patent and making part of the same.*

TO ALL WHOM IT MAY CONCERN:

Be it known that I, J. B. SMITH, of the city and county of Milwaukee, and State of Wisconsin, have invented a new and useful improvement in Coffee-Pots; and I do hereby declare that the following is a full, clear, and exact description thereof, which will enable those skilled in the art to make and use the same, reference being had to the accompanying drawing, forming part of this specification, in which—

Figure 1 is a sectional view, and

Figure 2 a top view.

Similar letters of reference in each of the figures indicate corresponding parts.

The object of my invention is to produce a coffee-pot in which coffee can be made and preserve all the aroma of the coffee, and this with certainty at all times, and also to protect the person pouring the coffee from being burned by the steam. I make my coffee-pot so as to have a water-space around the inside pot, with an opening at the top, over the handle, to pour in water, and for the escape of steam when the water in the outer pot or space is boiling, and above this opening, between it and the handle, I put a shield, to protect the hand from being burnt by steam when pouring out the coffee.

A, the outside pot; B, the inside pot; C, cover of the inside pot; D, spout; E, spout-lid; F, handle; G, opening through which to pour water into the space between the pots, and for the escape of steam when the water is boiling; H, shield to keep the steam from burning the hand when the coffee is being poured.

Operation: Put the coffee in the inner pot with boiling water, and fill the space between the two pots about half full of boiling water; then set on a stove or over the fire, when the water will boil in the water-space, the steam escaping through opening G. The water, with the coffee in the inner pot, will be kept just at the boiling point, but will not boil. When the coffee is being poured out the shield H will keep the steam issuing from opening G from coming in contact with the hand and burning it.

What I claim as my invention, and desire to secure by Letters Patent, is—

1. Shield H, in combination with double coffee-pot A and B, and handle F, substantially as and for the purpose described.

2. Double coffee-pot A and B, with opening G, shield H, and covers C and E, combined and arranged as described.

J. B. SMITH.

Witnesses:
G. W. MYGATT,
H. C. KOCH.